United States Patent [19]

Baxley et al.

[11] E Patent Number: Re. 33,264

[45] Reissued Date of Patent: Jul. 17, 1990

[54] BAG PACK

[75] Inventors: William H. Baxley; Marion H. Weatherford; Harry B. Wilfong, Jr.; Floyd B. Williams, all of Hartsville, S.C.

[73] Assignee: Sonoco Products Company, Hartsville, S.C.

[21] Appl. No.: 369,459

[22] Filed: Jun. 21, 1989

Related U.S. Patent Documents

Reissue of:

[64] Patent No.: 4,676,378
Issued: Jun. 30, 1987
Appl. No.: 853,589
Filed: Apr. 18, 1986

[51] Int. Cl.[5] ..... B65D 1/34

[52] U.S. Cl. ..... 206/554; 206/806; 383/9

[58] Field of Search ..... 206/554, 806; 383/9

[56] References Cited

U.S. PATENT DOCUMENTS

| | | | |
|---|---|---|---|
| 94,283 | 8/1869 | Collins . | |
| 2,899,161 | 8/1959 | Bayard | 248/101 |
| 3,089,633 | 5/1963 | Rensitaw | 206/806 |
| 3,184,055 | 5/1965 | Davis et al. | 206/554 |
| 3,243,937 | 4/1966 | Ragan | 53/384 |
| 3,262,249 | 7/1966 | Finerow | 53/385 |
| 3,317,037 | 5/1967 | Russell | 206/57 |
| 3,380,579 | 4/1968 | Pinto . | |
| 3,439,891 | 4/1969 | Pinto | 248/100 |
| 3,468,100 | 9/1969 | Rubel | 53/189 |
| 3,552,697 | 1/1971 | Pinto | 248/97 |
| 3,640,450 | 2/1972 | Lieberman | 229/53 |
| 3,646,723 | 3/1972 | Meroney | 53/390 |
| 3,747,298 | 3/1973 | Lieberman . | |
| 3,869,065 | 4/1975 | Wang | 221/40 |
| 3,973,376 | 8/1976 | Suominen | 53/385 |
| 4,062,170 | 12/1977 | Orem | 53/390 |
| 4,085,822 | 4/1978 | Osborn | 186/1 A |
| 4,111,297 | 9/1978 | Paulin | 206/806 |
| 4,199,122 | 4/1980 | Christie | 248/97 |
| 4,458,867 | 7/1984 | Malik | 248/97 |
| 4,462,538 | 7/1984 | Gendron | 206/806 |
| 4,480,750 | 11/1984 | Dancy | 206/554 |
| 4,487,388 | 12/1984 | Provan | 248/97 |
| 4,493,419 | 1/1985 | Prader et al. | 206/554 |
| 4,529,090 | 7/1985 | Pilon | 206/554 |
| 4,583,349 | 4/1986 | Kramming | 53/459 |

FOREIGN PATENT DOCUMENTS

| | | | |
|---|---|---|---|
| 7946582 | 1/1982 | Australia . | |
| 2803961 | 1/1978 | Fed. Rep. of Germany . | |
| 1486210 | 5/1967 | France | 206/806 |

*Primary Examiner*—Joseph Man-Fu Moy
*Attorney, Agent, or Firm*—Bell, Seltzer, Park & Gibson

[57] ABSTRACT

A bag pack formed of multiple stacked handle bags having aligned mounting apertures defined through the handles thereof for reception of mounting rods therethrough. The apertures are formed by partially severed flaps which are in turn bonded together to maintain aperture alignment. The flaps are integral with the bags along minor easily severed areas for a freeing of the bags upon a severance of the flaps simultaneous with or subsequent to reception of the mounting rods through the apertures.

23 Claims, 2 Drawing Sheets

FIG. 1
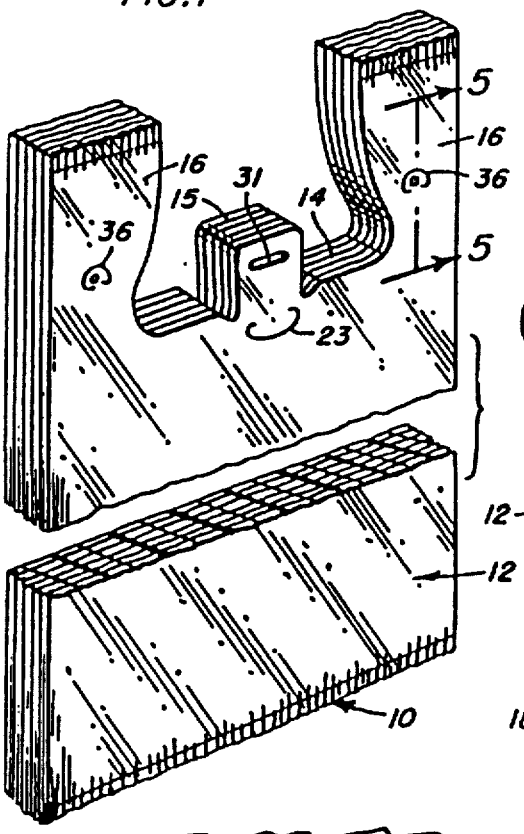
FIG. 2
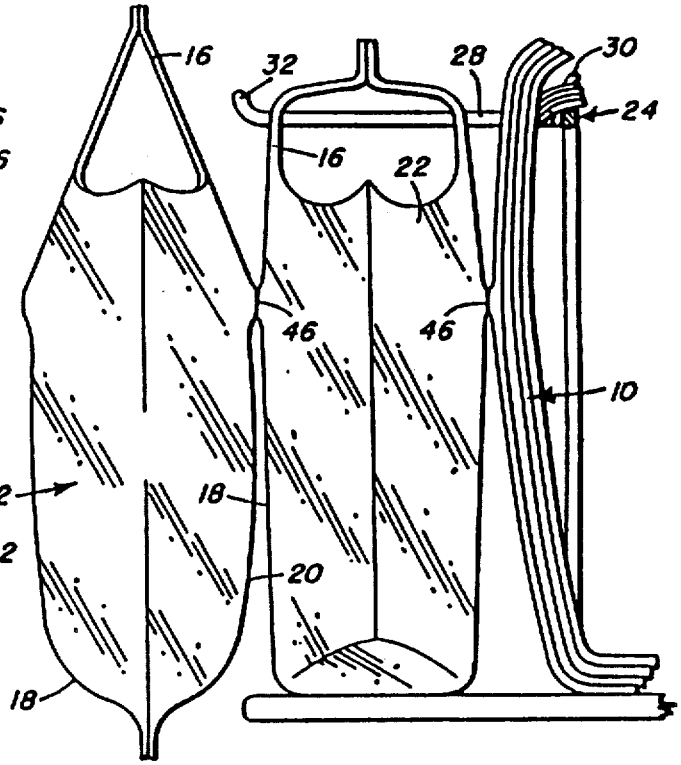
FIG. 3
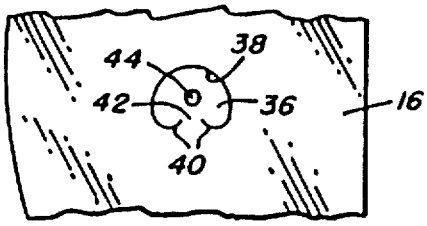
FIG. 4
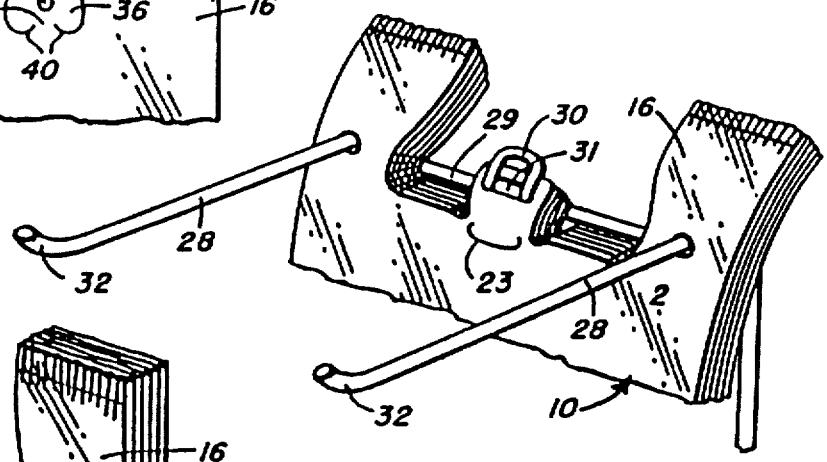
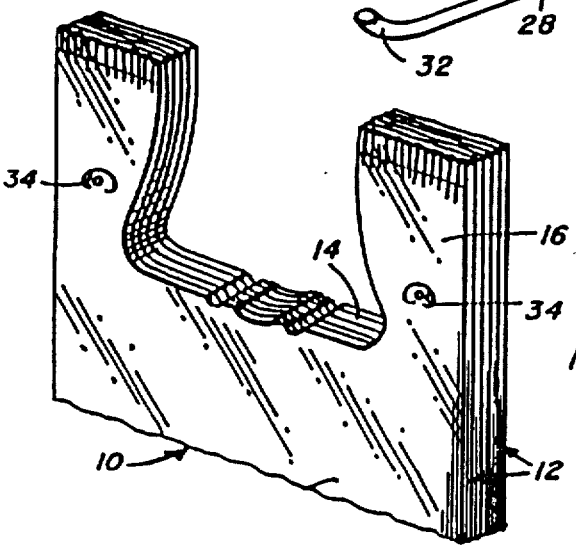
FIG. 5

BAG PACK

Matter enclosed in heavy brackets [ ] appears in the original patent but forms no part of this reissue specification; matter printed in italics indicates the additions made by reissue.

BACKGROUND OF THE INVENTION

The invention here is generally concerned with thermoplastic shopping bags and the like, and more particularly packs of such bags interrelated in a manner which enables the simultaneous mounting of multiple bags, as a unit, on a rack with the bags, in turn, being individually opened and loaded while on the rack, and subsequently removed therefrom.

Bags of the general type involved herein are frequently formed from flattened tube portions selectively severed from a length of tubing of appropriate material and subsequently heat sealed along the lower and upper edges thereof. An appropriate mouth-defining U-shaped cutout is normally made through the sealed upper edge, this cutout simultaneously defining both the upper mouth of the bag and a pair of laterally spaced handles. Such bags can be formed both with or without side gussets.

In has become increasingly common to provide such bags in packs for suspension on racks with the individual bags separately dispensed therefrom. Pursuant thereto, the pack bags have typically included apertured tear-off tabs with the rack support element received through the apertured tabs and with the entire tab being severed from the bag as the bag is removed from the rack for loading. Examples of bag packs of this type will be noted in the following patents:

U.S. Pat. No. 4,480,750, Dancy,

U.S. Pat. No. 4,529,090, Pilon.

In each of these patents, the forming of the mounting aperture simultaneously effects a heat sealing of the bags together. This in turn requires a severing of the bag from the tabs, and hence releasing the bag from the rack, as a precondition to opening the bag for loading.

Typical examples of multiple bags mounted on and dispensed from racks will be seen in the following patents:

U.S. Pat. No. 2,790,591-Rosen,

U.S. Pat. No. 4,106,733-Walitalo,

U.S. Pat. No. 4,106,734-Walitalo.

In each of the above, the bags include one or more aperture which receive a rod-like member therethrough.

Typical examples of multiple bags releasably adhesively bonded to each other in a pack will be seen in the following patents:

U.S. Pat. No. 2,715,493-Vogt,

U.S. Pat. No. 3,915,302-Farrelly et al.

SUMMARY OF THE INVENTION

Bags of the present invention are what are commonly referred to as T-shirt or handle bags, normally formed of a thin, highly flexible thermoplastic material.

It is a primary intention of the invention to provide such bags in multiple-bag packs wherein the bags are fixedly positioned relative to each other for mounting as a unit on a combined holding, loading and dispensing rack. In conjunction therewith, it is proposed that the bags of the bag pack be so formed as to receive support rods through the upstanding handles of the bags, both within the pack itself and as the bags are individually drawn therefrom and loaded.

In addition to the mounting of the bag pack at the mounting tabs as in Pilon, U.S. Pat. No. 4,529,090, provision is also made for a direct engagement and continued support of the individual bags on the rack for a filling of the bag after the individual bags are drawn from the packs. This basically involves defining of rod-receiving apertures through the stacked handles. It is of course essential that the apertures through the individual bags maintain exact alignment for introduction onto the mounting rods as a unit. This is inherently difficult primarily because of the extremely thin highly flexible nature of the material of the bags, particularly in the handle or handle portions thereof which is the desired area of support for the bags both as the bags are dispensed and during the filling of the bags.

In providing for bag handle alignment, or more particularly mounting aperture alignment, the present invention proposed an additional direct bonding of the bags to each other at the handle apertures. However, as can be appreciated, such a bonding or securing of the bags, while essential in maintaining the alignment of the apertures for a mounting of the bag pack, must not interfere with the removal of individual bags from the pack, and the related spreading of the handles for access thereto as a means for supporting the individual bag, both on the loading portion of the rack and by the utlimate carrier of the bag.

To accommodate the apparently conflicting problems of positive aperture alignment and free handle movement, the present invention proposes the formation of the apertures by the cutting of aperture-forming flaps from the handles, which flaps are retained integral with the corresponding handles by only a minor area. These minor areas are readily severable upon the application of a force thereto generated, as an example, either by the rod being introduced past the flaps and through the apertures, or by an outward pulling of one bag relative to another. In order to provide for the desired releasable securing of the bags with the handle apertures aligned, the flaps themselves are joined, preferably by heat bonding. Thus, until such time as the flaps are severed from the bags, the apertures are in fixed alignment with each other.

Inasmuch as the apertures which are to receive the support rods are to include an area of severance about the periphery thereof, it is particularly desirable that this area of severance not propagate a tear in the material when the aperture is subjected to stress from the support rod under bag-loading conditions. Accordingly, as the rod will naturally engage the upper periphery of the aperture the area of severance will be defined at the diammetrically opposed lower portion of the aperture periphery, the area of least stress. Further, the manner in which the apertures and flaps are formed provides for the area of severance inward of the circumference of the freely cut or severed major periphery of the apertures. In other words, the ends of each aperture cut line, which follows a circular path, terminate in inwardly curled spaced relation to each other whereby any tendency for the cut line to tear at the ends thereof will result in an inward tearing into the flap itself as opposed to into the bag or through the periphery of the aperture. Further, upon a severance of the individual flaps between the closely spaced ends of the cut line, the resultant material will comprise a small inwardly extended loose unstressed lip of material.

As a variation to the provision of the apertures directly through the bag handles, should it be desirable to maintain the handle integrity in order to preserve the maximum strength thereof while at the same time providing the desired support of the bags at the handles, the handles may be provided with inwardly directed integral tabs which constitute a permanent extension of the bag handles. These tabs in turn will have the aforedescribed flap-defined apertures therethrough.

The invention also contemplates a unique interaction between the individual bags of the pack as the bags are sequentially drawn from the rack-mounted pack, first for loading and subsequently for a removal from the rack for transportation. Basically, a readily severable adhesive engagement between the rear or inner face of each bag and the forward face of the big inwardly or immediately rearward thereof enables a forward drawing of a bag and a spreading of the wall thereof into the loading position as a previously loaded bag is removed from the rack. The rack itself is so configured so as to allow for a substantially automatic disengagement of the loaded bag from the subsequent bag as the subsequent bag reaches the loading position in a fully opened handle supported orientation.

It will be appreciated that the central mounting tabs, in addition to providing a support for the intermediate section of the pack, also facilitate an opening of the mouth of the individual bags as they are sequentially moved into loading or filling position.

Basically, each bag tab includes front and rear panels which are, respectively, extensions of the front and rear bag walls. Thus, as the front wall of a bag is drawn forward, it will sever from the associated tab panel while the corresponding rear wall is retained by its tab panel, resulting in a complete opening of the bag mouth. The rear wall will, in turn, sever from its tab panel during loading or filling of the bag. Alternatively, removal of the loaded bag will readily sever the rear wall of the bag from its tab panel.

Additional objects and advantages will become apparent from the details of construction and manner of use as more fully hereinafter described and claimed.

BRIEF DESCRIPTION OF THE DRAWINGS

FIG. 1 is a partial perspective view of a bag pack formed in accord with the present invention;

FIG. 2 is a side elevational view of a rack-mounted bag pack with selected bags drawn forwardly therefrom;

FIG. 3 is an enlarged plan view of a bag handle with a flap-defined mounting aperture therein;

FIG. 4 is a partial perspective view illustrating a bag pack mounted on a rack with the handles engaged with the pair of mounting rods and the tabs engaged with the central hook element;

FIG. 5 is a partial perspective view of a variation of the bags and pack wherein no central tab is provided;

DESCRIPTION OF PREFERRED EMBODIMENTS

Figure 6:
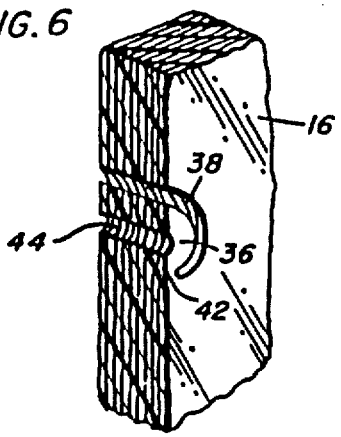
FIG. 6 is a cross-sectional detail, in perspective, taken substantially on a plane passing along line 6—6 in FIG. 1.
Figure 7:
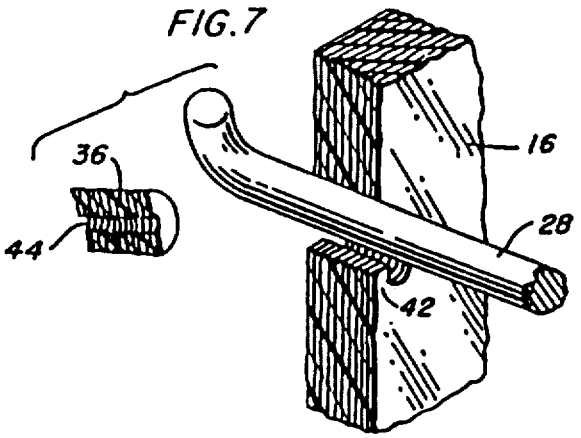
FIG. 7 is a cross-sectional detail similar to FIG. 6 illustrating the severance of the flaps as the pack mounts on a rod.

Referring now more specifically to the drawings, reference numeral 10 designates a bag pack formed, in accord with the present invention, of multiple individual bags 12.

The bags 12 are preferably of a lightweight, highly flexible and strong thermoplastic material, and are conventionally fabricated from a continuous plastic tube gusseted, flattened and heat sealed at opposed upper and lower ends. The mouth 14 of the bag 12 is formed by a cutout inwardly and centrally through the upper portion of the bag. This cutout defines a central mounting tab 15 and a pair of laterally spaced upwardly extending handles 16 formed of upwardly extending portions of the front and rear panels 18 and 20 of the bag 12 respectively as well as similarly upwardly extending portions of the side gussets 22. A cutline or slit 23, formed between the tab 15 and bag 12 provides, in a known manner, reduced force severable joinder areas for a ready severance of the bag from the tab. The multiple individual bags are in turn maintained in the pack 10 by a direct heat bonding of the tabs together. Such bag construction, as thus far described, is generally known in the art as will be appreciated from Pilon, U.S. Pat. No. 4,529,090.

It is a principal purpose of the invention to provide for the mounting of a pack 10 of the bags 12 on a support rack 24 for both the selective dispensing of the individual bags 12 and the support and suspension of the individual bags by the handles and with the open mouth upwardly directed for a loading of the bag. The rack 24 will basically consist of a flat base or support panel 26 and a pair of laterally spaced supporting arms 28 positioned vertically above the base panel 26 a distance sufficient to accommodate a fully expanded bag with the handles 16 engaged with support arms 28 and the bottom of the bag on the panel 26. A transverse member 29, extending between the support arms 28, will support a tab receiving hook element 30 for engagement through the tab apertures 31 as illustrated. The support arms 28 and transverse member 29 may be rigid with a vertical member which in turn has the lower end thereof appropriately rigidly affixed to the panel 26 toward the rear thereof. The bag pack 10 will normally be accommodated generally rearward on the rack 24 toward the upright, or vertical member, allowing for the forward extent of the support panel 26 and overlying support rods 28 to accommodate an opened bag for loading purposes. The rack 24 will also normally include upturned forward ends 32 on the laterally spaced horizontal support rods 28, for purposes which will be described subsequently.

As will be appreciated for FIGS. 2 and 4, it is specifically intended that the bag pack 10 be suspended from the support rods 28 by handles 16 in a manner whereby each individual bag 12, as it is moved forward from the pack 10, is retained in an upright open position, also by the handle engaged support rods 28, for a loading thereof prior to removal from the rack 24 and normally prior to a complete disengagement of the bag from the remainder of the pack. Accordingly, specific provision is made, in the present invention, for the engagement of the handles 16 with the support rods 28.

The engagement of the bag handles 16 is achieved by the provision of rod receiving aperture 34, one through each bag handle 16, at a central point slightly below mid-height thereof. However, in order for the bags to be loaded on the support arms 28 as a pack, it is essential that the formed mounting holes or apertures 34 be maintained in alignment. In order to achieve this alignment, each of the apertures is defined by a flap 36 severed from the corresponding handle 16 along a substantially circular cut line 38 which terminates in a pair of inwardly and upwardly curled ends 40 in close laterally spaced relation to each other at the bottom of the aperture 34, that is that portion of the aperture 34 directed to the bottom of the bag 12. These laterally spaced ends 40 define an integral joinder area 42 between the flap 36 and the bag handle 16 with this joinder are 42 being in the nature of a readily severable portion capable of being easily torn upon the introduction of a force thereto.

It is particularly significant that the ends 40 of the cut 38 be inwardly directed in that any tendency for these ends to propagate a tearing beyond the length thereof will result in an inward tearing into the flap itself, rather than a disruption of the bag, or more particularly the bag handle as might affect its carrying capability. Further, inasmuch as the flap 36 is to ultimately be severed between the ends 40, it is particularly desirable that this area of severance be slightly inward of the periphery of the aperture as defined by the major circular portion of the cut 38, again to effectively prevent any tendency for the tear area to propagate a tearing of the handle beyond the small severance area or portion. In conjunction therewith, it will also be appreciated that the area of severance, located at the bottom of the rod receiving aperture 34, is at the point of least stress upon a suspension of the bag from the rods 28 in that the rods 28 will engage the upper periphery of the apertures 34, centrally within the area of the smooth circular cut 38.

Incidentally, as should be readily apparent, reference to an aperture or hole 34 through a corresponding handle 16, in conjunction with the aperature defining flap 36, actually entails a forming of flaps and apertures through all layers of the corresponding handle 16, including the handle extensions of the front and rear bag panels and the extensions of the interposed side gusset 22.

As a practical expedient, the partially severed flaps 36, and apertures 34 defined thereby, will normally be cut through the stacked handles after an assembly of multiple bags in a pack. Either prior to or simultaneously with the forming of the cut line 38 through the stacked bag handles, the flaps 36, or those areas which are to define the flaps 36, are bonded together throughout the full stack, including the multiple layers thereof. This may be effected by the use of a heated pin or rod extended centrally through the flaps 36 to directly heat seal the flaps together as indicated by the flap traversing central bore 44.

The heat bonding of the flap 36 together, in both stacks of handles 16, bonds the bags of the bag pack together in a manner whereby the mounting apertures 34 are fixed in alignment for a simplified and expedient mounting of the handles on the support rods 28 of the rack 24. One need merely grasp the two handle stacks of each bag pack and slide the handles over the support rods 28 with the rods 28 moving easily through the aligned apertures 34. As the pack is moved to the rear of the rack, the bonded together tabs 15 are in turn engaged with the hook element 30.

Figure 8:
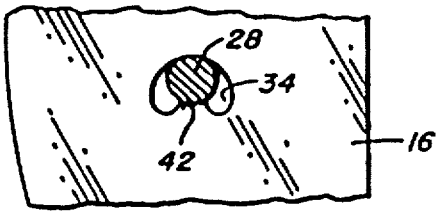
FIG. 8 is a plan detail of a rod-mounted pack detailing the rod and aperture relationship.
Figure 9:
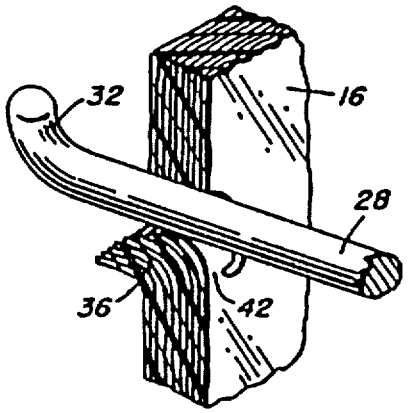
FIG. 9 is a cross-sectional detail similar to FIG. 7 illustrating a variation wherein the flaps, rather than being severed upon the introduction of the mounting rod, will sever upon the selected dispensing of the individual bags from the pack.

Noting FIG. 6, it is contemplated that as the bags move onto the support rods 28, the rods will sever the aligning flaps 36 which, in the mounted bags, are no longer necessary. The actual severing of the flaps will take place at the severance point 42 of the individual flaps which, as previously described, is so located as to be in the area of least stress to both preclude tear propagation and maintain structural integrity. As suggested in FIG. 8, should the introduction of the rods 28 not effect a complete severing of the flaps 36, the flap 36 will be folded downward with the actual severing thereof, and hence the releasing of the individual bags, being effected during the movement of the individual bags, forwardly to the loading position. In other words, a slight forward pulling on the leading bag, and particularly the forward portions of the handles thereof, will readily sever the flaps at the severance areas 42 if such a severance has not in fact occurred upon the initial introduction of the rods 28.

In order to facilitate an automatic following and opening of the bags during the loading operation, the rear panel 20 of each bag 12, centrally thereof and in slightly spaced relation below the bag mouth 14, is provided with a minor area of readily disengageable adhesive 46 which adhesively bonds to the forward panel 18 of a following or underlying bag 12. Noting FIG. 2 in particular, after the loading of a first bag 12, the handles 16 thereof are grasped and the bag moved off of the upturned ends 32 of the support arms 28. This results in a simultaneous forward drawing, through the adhesively bonded area 46, of the front wall of a following bag. The front wall will sever from its tab panel and forward progress of the following bag will be resisted by the leading portion of the handles engaging the upturned ends 32 on the support arms 28. This reaction is greater than the bonding force of the adhesive 46 whereby the adhesive bonding between the loading bag and the following bag is severed, leaving the following bag in an open upwardly directed position for loading. As will be appreciated, the adhesive bonding need only be sufficient to sever the following front wall from its tab panel and move the extremely lightweight flexible bag. Inasmuch as there is no adhesive between the front and rear walls or panels of the single bags, the following bag will open as the rear wall thereof is retained by the adhesive bonding to the front wall of the bag therebehind.

Figure 10:
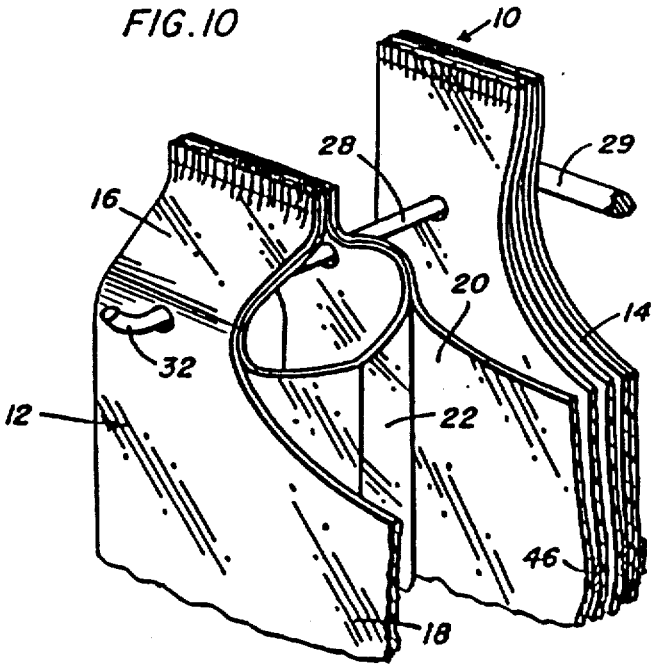
FIG. 10 is a partial perspective view illustrating a bag forwardly drawn from the pack and maintained on a support rod in its loading position.
Figure 11:
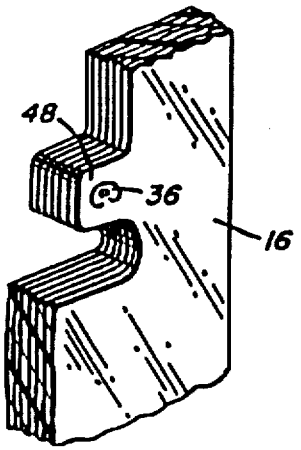
FIG. 11 is a partial perspective detail of a variation with regard to location of the flap-defined mounting apertures.

Noting FIG. 10, as a variation, the flap-formed handle mounting apertures can be defined through tabs 48 integrally formed on the inner vertical edges of the handles 16, the flaps and apertures formed in the tabs 48 duplicating the flaps and apertures 36 and 34 previously described. The particular advantage in such an arrangement is that the actual integrity of the handle 16 need not be violated. The tabs 48, as an integral portion of the corresponding handles 16, remain therewith after a severance of the flaps.

The preferred flap and aperture configuration has been illustrated and described in detail, however, other configurations are possible within the scope of the invention. In each instance, the aperture-defining cut lines are to so configured whereby any tendency for the bag to tear beyond the cut lines will be inwardly directed toward the removable flap and will not affect the integrity of the handle. Similarly, the severance point or area should also not affect bag integrity, and thus should be located in the area of minimum stress and within what might be considered the periphery of the flap itself. The flaps, regardless of their particular configuration, will be bonded together to define the temporary means for aligning the apertures and stabilizing the stacked bag handles for simultaneous mounting on the support rods 28 of an appropriate rack 24. Noting FIG. 5, while the bags have been presented and detailed above as including central mounting tabs, a variation wherein the bags are formed without these tabs is also contemplated. In such a case, the bags 12 will be mounted, as a pack 10, only on the support arms 28 received through the bag handle apertures 34. The manner of moving the individual bags to a loading position will remain substantially the same as above described, with the leading bag opening the immediately following bag by means of the adhesively bonded area 46.

From the foregoing, it will be appreciated that the unique aperture-defining flaps, which function as a means to align and interengage the handles of the individual bags of a bag pack, provide for a mounting of the pack as a unit with the individual bags, simultaneously with the mounting thereof, being sufficiently disengaged from the remainder of the bags in the pack to enable a sequential forward drawing of the bags, while maintaining the full support thereof, to an open loading position. There is no necessity for removal of the individual bags from the support arms or rack for a loading thereof. Further, the bags, notwithstanding the thin and highly flexible nature of the material thereof, are readily handable as a pack:

We claim:

1. A bag pack mountable on laterally spaced support rods of a support rack and comprising multiple stacked handle bags, each handle bag comprising front and rear bag walls defining an open top, and a pair of laterally spaced handles projecting upwardly from the open top of each bag, each handle including overlying front and rear handle panels projecting upwardly respectively from the front and rear bag walls; said multiple stacked bags being positioned with the corresponding handles of the pair of handles of each bag in stacked aligned overlying relation forming a pair of handle stacks associated with said stacked bags, aligned mounting apertures through the handles of each handle stack for simultaneous reception of each handle stack on a corresponding support rod receivable through the aligned apertures, bag retaining means on said bags fixing said handles together in each said handle stack for maintaining the apertures in alignment, said bag retaining means comprising a flap within each aperture integral with the corresponding bag at a minor area on the periphery of the aperture, said minor area comprising a severance area and defining said severable means, the flaps of the apertures in each handle stack being fixedly secured to the adjacent flaps for retention of the flaps in overlying aligned relation and said apertures in alignment, said severable means defining a connection between the retaining means and the bags for severance from the bags in response to introduction of the support rods through the aligned apertures and movement of the bags along the rods in supporting relation to the rods.

2. The bag pack of claim 1 wherein the periphery of each aperture includes an upper bearing area which directly receives and engages against a support rod upon the suspension of a bag therefrom, said severance area being generally directly opposed to said bearing area.

3. The bag pack of claim 2 wherein said severance area is positioned inward of the major periphery of the corresponding aperture.

4. The bag pack of claim 3 wherein each flap, and hence the periphery of the corresponding aperture, is defined by a circular cut line having the opposite ends generally inwardly directed toward the center of the defined circle and in closely spaced lateral relation to each other with the severance area defined therebetween.

5. The bag pack of claim 4 including minor areas of releasable adhesive bonding between the overlying rear wall of each bag in the stack and the front wall of the bag immediately therebehind.

6. The bag back of claim 5 including detachable tab means projecting upwardly from the defined open top of each bag between the laterally spaced handles, said tab means including a mounting aperture defined therethrough for central support of the pack from a rack in conjunction with the handle support by rack support rods, and a readily severable area integrally joining each tab means of the associated bag.

7. The bag back of claim 1 including detachable tab means projecting upwardly from the defined open top of each bag between the laterally spaced handles, said tab means including a mounting aperture defined therethrough for central support of the pack from a rack in conjunction with the handle support by rack support rods, and a readily severable area integrally joining each tab means to the associated bag.

8. A bag pack mountable on laterally spaced support rods and comprising multiple stacked handle bags, each handle bag comprising front and rear bag walls defining an open top, and a pair of laterally spaced handles projecting upward from the open top of each bag, each handle including overlying front and rear handle panels projecting upwardly from the front and rear bag walls respectively, said multiple stacked bags being positioned with the corresponding handles of the pair of handles of each bag in stacked aligned overlying relation forming a pair of handle stacks associated with said stacked bags, aligned mounting apertures through the handles of each handle stack for simultaneous reception of each handle stack on a corresponding support rod receivable through the aligned apertures, each mounting aperture being formed by a cut line through the corresponding handle, said cut line having an intermediate portion and opposed end portions, said end portions being generally arcuately turned inward toward each other and said intermediate portion, said end portions terminating in spaced relation to each other to define an unsevered portion therebetween, said cut line defining a flap in the aperture formed by said cut line, said flap being selectively displaced away from said aperture upon introduction of a support rod therethrough, and means for fixedly securing the flaps of the aligned apertures of each handle stack together for a retention of said apertures in alignment prior to engagement of a support rod therethrough.

9. The bag pack of claim 8 wherein said cut line is substantially circular.

10. The bag pack of claim 8 wherein adjoining flaps in each handle stack are heat bonded together.

11. The bag back of claim 10 including a releasable adhesive joinder between the facing walls of adjacent bags of said multiple stacked bags.

12. The bag pack of 8 including detachable tab means projecting upwardly from the defined open top of each bag between the laterally spaced handles, said tab means including a mounting aperture defined therethrough, and a readily severable area integrally joining each tab means to the associated bag.

13. The bag pack of claim 8 including an integral laterally directed tab formed on each bag handle planar therewith and projecting inwardly toward the second of the pair of handles, each tab having one of said flap-defined apertures therethrough.

14. A bag dispensing system comprising a bag pack of multiple stacked handle bags, and a rack for mounting said bag pack and loading and individually removing bags from said bag pack; said rack comprising a pair of laterally spaced elongate support rods having leading ends; said bag pack comprising multiple stacked handle bags, each handle bag comprising a pair of laterally spaced upwardly projecting handles, said multiple stacked bags being positioned with the corresponding handles of the pair of handles of each bag in stacked aligned overlying relation forming a pair of handle stacks aligned mounting apertures through the handles of each handle stack for simultaneous reception of each handle stack over a corresponding one of said support rods receivable through the aligned apertures, each said aperture being defined by a flap partially severed from the associated bag handle, and means bonding each of said flaps to the adjoining flaps of the aligned apertures of each handle stack, said flaps being removed from said apertures upon introduction of a support rod through the aligned apertures of each handle stack.

15. The system of claim 14 wherein each handle bag comprises front and rear bag walls defining an open top, said handles projecting upwardly from said open top and including overlying front and rear handle panels defining extensions of said front and rear bag walls respectively, the front and rear handle panels of each handle being joined at the upper ends thereof remote from said bag mouth, the aperture through each bag handle being defined through the corresponding front and rear handle panels.

16. The system of claim 15 wherein a releasable bonding means in provided between each bag and the adjoining bags of said multiple stacked bags, said releasable bonding means being provided between the walls of said bags below the mouth thereof.

17. The system of claim 15 wherein said rack includes hook means between said support rods and inward of said leading ends, and detachable tab means projecting upwardly from the defined open top of each bag between the laterally spaced handles, said tab means including a mounting aperture defined therethrough for engagement of the rack hook means therethrough in conjunction with the handle engagement with the rack support rods, and a readily severable area integrally joining each tab means to the associated bag.

18. A bag pack mountable on support rod means and comprising multiple stacked bags, each bag of the stacked bags comprising front and rear bag walls defining an open top, aligned mounting apertures through the stacked bags for simultaneous reception of the stacked bags on support rod means receivable through the aligned apertures, each mounting aperture being formed by a cut line through the corresponding bag, said cut line having an intermediate portion and opposed end portions, said end portions being generally inwardly turned toward each other and said intermediate portion, said end portions terminating in spaced relation to each other to define an unsevered portion therebetween, said cut line defining a flap in the aperture formed by said cut line, said flap being selectively displaced away from said aperture upon introduction of support rod means therethrough, and means for fixedly securing the flaps of the aligned apertures of the stacked bags together for a retention of said apertures in alignment prior to engagement of support rod means therethrough.

19. The bag pack of claim 18 wherein adjoining flaps are heat bonded together.

20. The bag pack of 18 including detachable tab means projecting upwardly from the defined open top of each bag between the laterally spaced handles, said tab means including a mounting aperture defined therethrough, and a readily severable area integrally joining each tab means to the associated bag.

*21. A system for mounting a pack of thermoplastic grocery bags of the T-shirt type on a rack, for supporting consecutive bags from said pack on said rack in an open loading position and for facilitating easy removal of the consecutive loaded bags from said rack; said system comprising;*

*a bag pack comprising a plurality of stacked T-shirt type bags secured together, each of said bags comprising*

*front and rear wall portions integrally connected at sides thereof and secured together at the bottom thereof and defining an open top mouth portion,*

*laterally spaced handles integral with said wall portions and extending upwardly from opposed sides of said mouth portion,*

*a support rod receiving aperture formed through an intermediate portion of each of said handles,*

*a detachable mounting tab extending upwardly from each of said front and rear wall portions at a central area of said mouth portion,*

*a mounting aperture in each of said detachable mounting tabs, and*

*means bonding said tabs together for maintaining said bags together in said pack; and*

*a rack comprising*

*a generally horizontal base,*

*generally vertical frame members mounted on and extending from one side of said base,*

*two laterally spaced generally horizontal support rod means having free outer ends and carried by and extending outwardly from the upper portion of said vertical frame members (1) for slidably receiving said apertures in said bag handles of said pack, (2) for supporting consecutive ones of said bags in an open loading position as said bags are consecutively removed from said pack and slid along said support rods and (3)* for facilitating removal of loaded bags by sliding said handles off said support rods at said free outer ends, and

*retaining means carried by the upper portion of said vertical frame members between said support rod means and extending outwardly therefrom a distance less than the extension of said support rod means (1) for receiving said apertures in said detachable mount-*

*ing tabs, (2) for cooperating with said support rod means to mount said bag pack on said rack and (3) for allowing consecutive detachment of said front and rear wall portions of said bags from said mounting tabs as said bags are slid outwardly along said support rod means into the open loading position by retaining said mounting tabs on said retaining means.*

*22. A system, as set forth in claim 21, in which each of said bags in said pack further includes a tab portion integrally connected to each of said handles at an intermediate portion thereof and extending generally inwardly from the inner edges of said handles, and in which said support rod receiving aperture of each of said handles of each of said bags is formed in said respective tab portion to preserve maximum strength in said handles.*

*23. A system, as set forth in claim 21 or 22, in which said bag pack further includes disengagable adhesive means connecting each said rear wall portion to each said front wall below said mouth portion of each consecutive bag in said bag pack to facilitate consecutive opening of each of said bags as a loaded bag is removed from said rack.*

* * * * *

UNITED STATES PATENT AND TRADEMARK OFFICE

CERTIFICATE OF CORRECTION

PATENT NO. : Re. 33,264

DATED : July 17, 1990

INVENTOR(S) : Baxley et al.

It is certified that error appears in the above-identified patent and that said Letters Patent is hereby corrected as shown below:

Column 1, line 27, "In" should be -- It --.

Column 4, line 46, "supporting" should be -- support --.

Column 5, line 67, "flap" should be -- flaps --.

Column 6, line 44, "reaction" should be -- resistance --.

Column 7, line 3, after the word "to" insert -- be --.

Column 8, line 14, "opposite" should be -- opposed --.

Column 9, line 51, "in" should be -- is --.

Signed and Sealed this

First Day of October, 1991

*Attest:*

*Attesting Officer*

HARRY F. MANBECK, JR.

*Commissioner of Patents and Trademarks*